United States Patent
Lee et al.

(10) Patent No.: US 9,026,585 B2
(45) Date of Patent: May 5, 2015

(54) SYSTEM AND METHOD FOR PROVIDING CONTENT DOWNLOAD SERVICE

(75) Inventors: Dong-Yul Lee, Gyeongsangbuk-do (KR); Dong-Guen Hong, Gyeongsangbuk-do (KR); Kee-Ho Yang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 5 days.

(21) Appl. No.: 13/428,508

(22) Filed: Mar. 23, 2012

(65) Prior Publication Data
US 2012/0254298 A1    Oct. 4, 2012

(30) Foreign Application Priority Data
Mar. 30, 2011    (KR) .................. 10-2011-0029125

(51) Int. Cl.
| | |
|---|---|
| G06F 15/16 | (2006.01) |
| H04W 12/06 | (2009.01) |
| H04W 4/00 | (2009.01) |
| H04L 29/06 | (2006.01) |
| H04L 29/08 | (2006.01) |
| H04N 21/258 | (2011.01) |
| H04N 21/426 | (2011.01) |
| H04N 21/4363 | (2011.01) |
| H04N 21/462 | (2011.01) |
| H04N 21/6375 | (2011.01) |
| H04N 21/658 | (2011.01) |
| H04N 21/8352 | (2011.01) |
| H04N 21/845 | (2011.01) |

(52) U.S. Cl.
CPC .............. *H04W 12/06* (2013.01); *H04W 4/001* (2013.01); *H04W 4/003* (2013.01); *H04L 63/0884* (2013.01); *H04L 67/06* (2013.01); *H04N 21/25816* (2013.01); *H04N 21/42684* (2013.01); *H04N 21/43637* (2013.01); *H04N 21/4622* (2013.01); *H04N 21/6375* (2013.01); *H04N 21/6581* (2013.01); *H04N 21/8352* (2013.01); *H04N 21/8456* (2013.01)

(58) Field of Classification Search
USPC ........................................ 709/203, 219, 231
See application file for complete search history.

(56) References Cited

U.S. PATENT DOCUMENTS

| | | | | |
|---|---|---|---|---|
| 7,058,722 | B2 * | 6/2006 | Ikami et al. .................. | 709/231 |
| 7,865,572 | B2 * | 1/2011 | Ho et al. ....................... | 709/217 |
| 7,937,451 | B2 * | 5/2011 | Ho et al. ....................... | 709/217 |
| 8,260,881 | B1 * | 9/2012 | Paleja et al. .................. | 709/218 |
| 2012/0102315 | A1 * | 4/2012 | Holtmanns et al. ........... | 713/150 |

* cited by examiner

*Primary Examiner* — Joon H Hwang
*Assistant Examiner* — Cheikh Ndiaye
(74) *Attorney, Agent, or Firm* — Cha & Reiter, LLC

(57) ABSTRACT

A system and method for providing a content download service, that preferably includes a content service server for receiving a request for a content service from a client terminal accessed through a network, and identifying the client terminal and one or more sub-client terminals connected to the client terminal to route the requested contents and a download control signal. A client terminal obtains inherent information from one or more adjacent terminals to request a service from the content service server, and decodes transmitted contents by using the inherent information of the adjacent terminals when receiving the download control signal from the content service server.

18 Claims, 2 Drawing Sheets

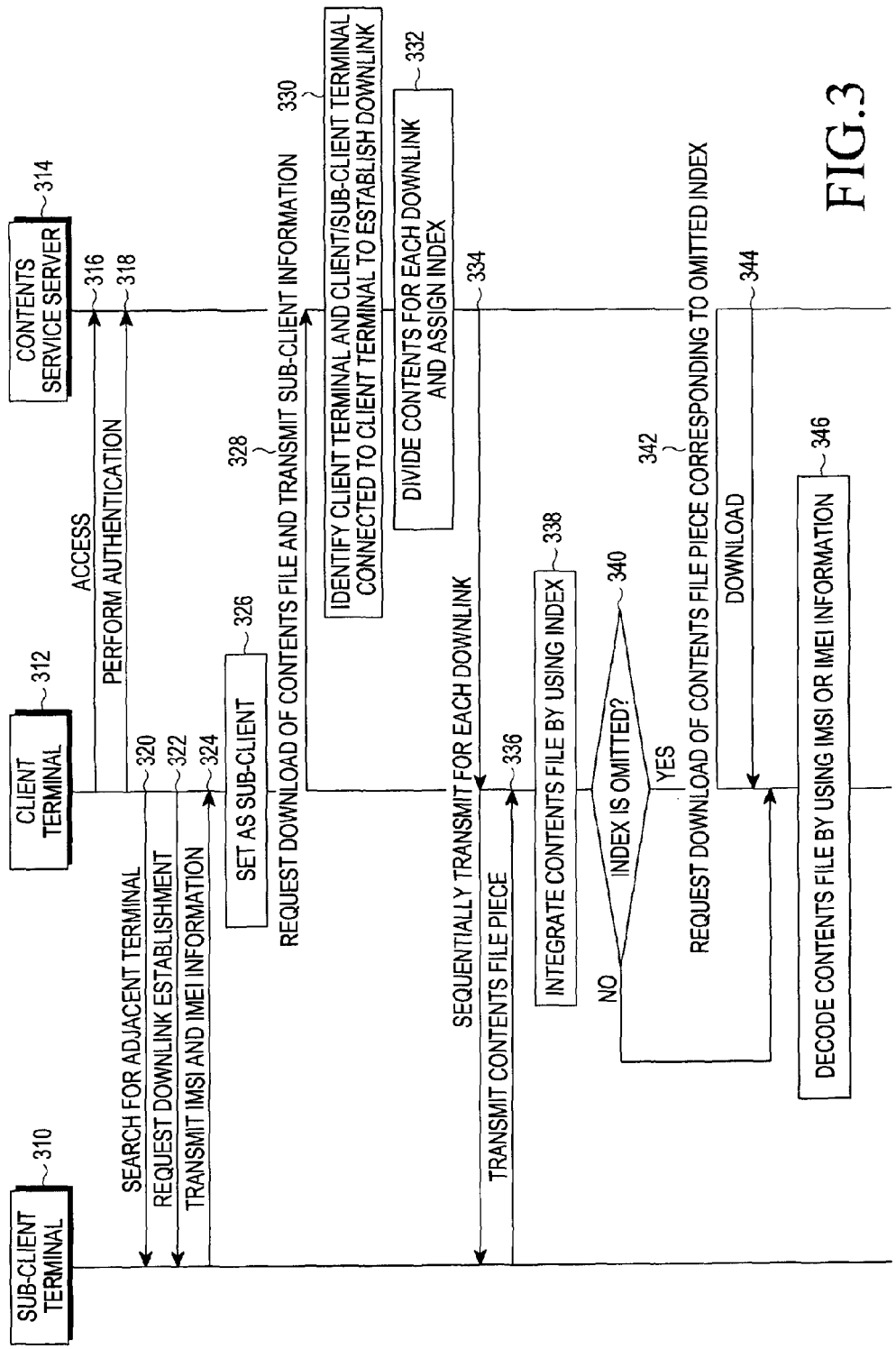

SYSTEM AND METHOD FOR PROVIDING CONTENT DOWNLOAD SERVICE

CLAIM OF PRIORITY

This application claims priority under 35 U.S.C. §119(a) from a Korean Patent Application entitled "System and Method for Providing Content Download Service" filed in the Korean Intellectual Property Office on Mar. 30, 2011 and assigned Serial No. 10-2011-0029125, the contents of which are incorporated herein by reference in its entirety.

BACKGROUND OF THE INVENTION

1. Field of the Invention

The present invention relates to a system and a method for providing a content download service. More particularly, the prevent invention relates to a system and method for downloading content to mobile devices.

2. Description of the Related Art

With the technical development of mobile devices, it became possible that a mobile communication terminal could include various multimedia functions in addition to a simple telephone communication function and access of the Internet. In particularly, a device having a Personal Digital Assistant (PDA) function, such as a smart phone, can execute various multimedia services.

There has been an increase in user demand to simply and conveniently enjoy a high quality content service in the mobile environment through a multimedia service provided in the mobile environment.

FIG. 1 illustrates a schematic construction of a conventional system for providing a content download service. Referring now to FIG. 1, when a mobile terminal 100 requests a content download from a content service server 110, a content download service is performed through the following process. The mobile terminal 100 accesses the content service server 110 through various kinds of authentication procedures. When the authentication is completed, the mobile terminal 100 requests contents, which the mobile terminal 100 desires to download, and receives the requested contents from the content service server 110. Then, the mobile terminal 100 transmits a control signal according to the download to the content service server 110 that can indicate receipt or non-receipt of the contents.

In general, a high-capacity content file, such as a multimedia file has a larger size than that of conventional contents files. For example, a general drama has a size of about 100-250 MB. Therefore, a problem occurs in that it takes too much time to download contents having a size of 100 MB in one terminal at a speed of 2.7 Mbps in a 3G network, not a WiFi network.

SUMMARY OF THE INVENTION

Accordingly, the present invention has been made in part to solve at least some of the above-stated problems and the present invention reduces the time spent on a download the present invention preferably applies a distributed processing of a download of requested contents to a plurality of sub-clients associated with a single client terminal, instead of (or possibly in addition to) the single client terminal, in a content download.

In accordance with an exemplary aspect of the present invention, there is provided a system for providing a content download service, the system preferably including a content service server that receives a request for a content service from a client terminal accessed through a network, and identifying the client terminal and one or more sub-client terminals connected to the client terminal to route the requested contents and a download control signal; and a client terminal that acquires inherent information from one or more adjacent terminals to request a service from the content service server, and decoding transmitted contents by using the inherent information of the adjacent terminals when receiving the download control signal from the content service server.

In accordance with another exemplary aspect of the present invention, there is provided a method of providing a content download service, the method preferably including receiving a request for a content service from a client terminal accessed through a network, and performing an authentication of the client terminal; searching for an adjacent terminal of the client terminal, and making a request for a downlink establishment from a content service server currently accessing the searched adjacent terminal; receiving inherent information from an adjacent terminal permitting the request, and setting the adjacent terminal as a sub-client terminal of the client terminal; and identifying the client terminal and a sub-client terminal connected to the client terminal to route the requested contents and a download control signal.

BRIEF DESCRIPTION OF THE DRAWINGS

The above and other exemplary aspects, features and advantages of the present invention will become more apparent to the person of ordinary skill in the art from the following detailed description taken in conjunction with the accompanying drawings, in which:

FIG. 3 is a flowchart illustrating a method of providing a content download service according to an exemplary embodiment of the present invention.

DETAILED DESCRIPTION

Figure 1:
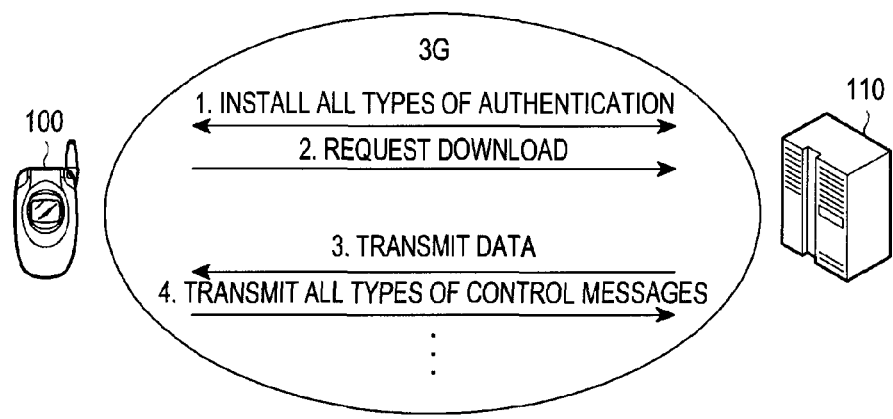
FIG. 1 is a conventional diagram schematically illustrating a system for providing a content download service.

Hereinafter, the first exemplary embodiments of the present invention will be described with reference to the accompanying drawings. Further, specific details discloses in the following description are provided for illustrative purposes only to help in a general understanding of the present invention. The person of ordinary skill in the art will appreciate that various modifications, additions, and substitutions are possible, without departing from the scope and spirit of the invention as disclosed in the appended claims.

The present invention provides a content download service, and more particularly improves the content download speed by applying a mobile cloud technology in downloading contents through a network. For this purpose, when a content download is requested, a content service server identifies a client terminal having requested the content download and one or more sub-clients connected to the client terminal to establish each downlink, and divides the contents for each of the established downlink to sequentially transmit the divided contents. Subsequently, a content file piece divided for each downlink and transmitted to the sub-client is integrated in the client terminal. Accordingly, a technology is provided in which it is possible to reduce the time spent on a download by applying a distributed processing to a download of requested contents from a plurality of sub-clients associated with a single client terminal, and not (i.e. rather than or instead of)

the single client terminal, in a content download, and to receive promptly a service without initiating a separate authentication procedure in using a download service required to pay, by requesting a downlink establishment from a content service server by using inherent identification information of a sub-client associated with the client terminal that has requested the contents, and decoding the downloaded contents.

Further, the client terminal and the sub-client terminal according to embodiments of the present invention may include all kinds of information communication apparatuses and multimedia apparatuses such as a digital broadcasting terminal, a Personal Digital Assistant (PDA), a smart phone, a 3G terminal, for example, an IMT-2000 (International Mobile Telecommunication 2000) terminal, a WCDMA (Wideband Code Division Multiple Access) terminal, a GSM/GPRS (Global System for Mobile Communication Packet Radio Service), and a UMTS (Universal Mobile Telecommunication Service) terminal. However, it will be easily understood by those in the art that a construction described herein according to exemplary embodiments of the present invention may also be applied to fixed terminals such as a digital TV, a desk top computer, etc., just to name a few possibilities except a case where the construction according to exemplary embodiments of the present invention may be applied to only a portable terminal.

Hereinafter, a system for providing a content download service according to an exemplary embodiment of the present invention will be described in detail with reference to FIG. 2.

Figure 2:
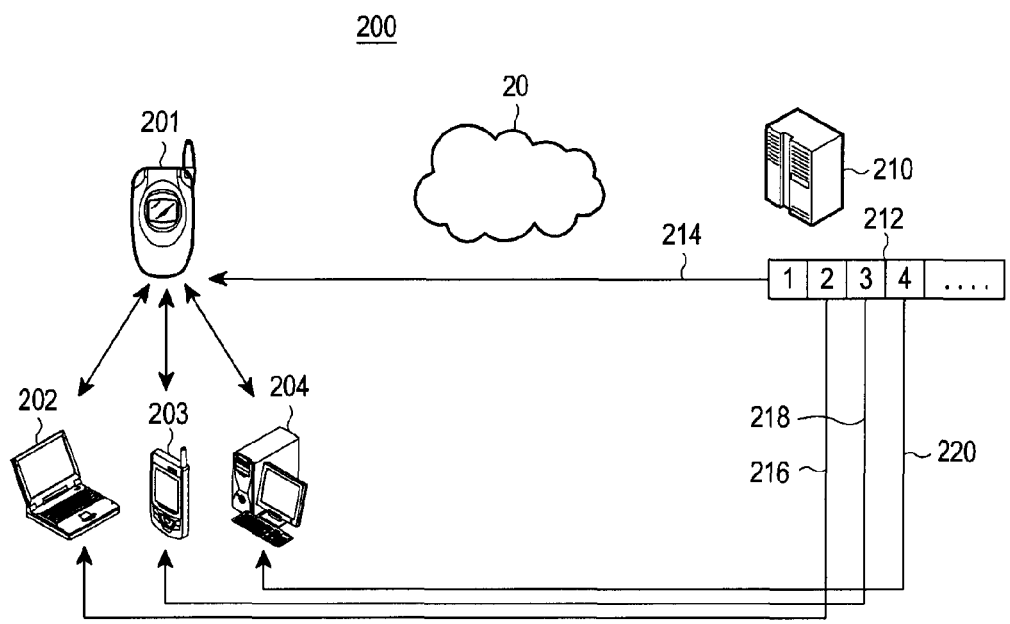
FIG. 2 is a diagram schematically illustrating a system for providing a content download service according to an exemplary embodiment of the present invention.

FIG. 2 a schematic diagram of a system for providing a content download service according to an exemplary embodiment of the present invention.

The system 200 for providing the content download service, which is a system to which the present invention is applied, preferably includes a content service server 210 receiving a request for a content service through a predetermined channel from a client terminal 201 accessed through a network 20, and identifying one or more sub-client terminals 202, 203, and 204 coupled with and/or communicatively connected to the client terminal 201 through inherent information of a sub-client terminal provided by the client terminal 201 upon receiving the content service request. The system 200 for providing the content download service also preferably includes the client terminal 201 obtaining inherent information from a content service server 210, which routes the requested contents and a download control signal, and one or more adjacent terminals to request a service from the content service server 210, and decoding the transmitted contents by using the inherent information of the adjacent terminal when receiving the download control signal from the content service server 210.

The content service server 210, which includes at least a processor or microprocessor and a memory, establishes downlinks 214 to the client terminal 201 and downlinks, 216, 218, and 220 for each of the sub-client terminals 202, 203, and 204 connected to the client terminal 201 accessed through the network 20, and sequentially divides the requested contents for each of the established downlinks 214, 216, 218, and 220 to transmit the divided contents.

In exemplary embodiments of the present invention, a network 20 environment connecting the client terminal 201 and the content service server 210 preferably refers to a wireless Internet environment such as a 3G or WiFi network, and a content file downloaded from the content service server 210 refers to a high-capacity multimedia data file such as a movie or a drama. However, the aforementioned examples are merely illustrative and the presently claimed invention is not limited thereto.

The client terminal 201 searches for one or more adjacent terminals, with which the client terminal 201 can communicate, and makes a request for a downlink establishment with a content service server 210, from which the client terminal 201 desires to receive a download service, currently accesses the adjacent terminal, and receives corresponding inherent information of the adjacent terminal having permitted the request to set the adjacent terminal as being one or more of its own sub-client terminals 202, 203, and 204.

At this time, the client terminal 201 and one or more sub-client terminals 202, 203, and 204 connected to the client terminal 201 can communicate through a local wireless communication connection based on, for example, WiFi or Bluetooth communication. For example, when the client terminal 201 and the sub-client terminals 202, 203, and 204 are connected through Bluetooth communication, the client terminal 201, which requests Bluetooth communication for performing the Bluetooth communication, searches for an adjacent terminal capable of performing the Bluetooth communication within a predetermined region. After the search, the client terminal 201, which requests the Bluetooth communication, can perform the Bluetooth communication through a connection process with the searched adjacent Bluetooth communication device, that is, the sub-client terminals 202, 203, and 204.

More particularly, the client terminal 201 may broadcast an inquiry message in order to search for the sub-client terminal capable of performing the Bluetooth communication in a inquiry process of searching for devices, which in this case comprises the sub-client terminals 202, 203, and 204, capable of performing the Bluetooth communication located within a predetermined region where communication is possible. In response to the inquiry message, when the adjacent sub-client terminal of which a state is changed from a standby state to a wake up state receives the inquiry message while scanning channels, a response message to the inquiry message is transmitted to the client terminal 201 having transmitted the inquiry message, and the client terminal 201 preferably transmits a request message concerning the downlink establishment with the content service server 210, to which the client terminal is currently connected, only to a sub-client terminal having transmitted a response message, which is a permission request message for the downlink establishment.

Thereafter, the client terminal 201 receives inherent information of one or more adjacent terminals being permitted from the request for the downlink establishment to set the adjacent terminal as its sub-client terminal. At this time, the inherent information transmitted from the sub-client terminals 202, 203, and 204 contains corresponding terminal's International Mobile Station Identify (IMSI) and International Mobile Equipment Identify (IMEI) required for a charge.

As described above, the client terminal 201 receives inherent information of one or more adjacent terminals from, for example, a phone book and/or sub-client list, preregisters the received inherent information as its own sub-client terminal, and selects a specific sub-client terminal from among the registered list, so that a downlink is established between the content service server 210 and the selected sub-client terminal without a separate search for adjacent sub-client terminal or a request for approval in each content division download. At this time, the sub-client terminal preregistered in the client terminal 201 is a sub-client terminal, which approves a charge generation according to the downlink establishment between the content service server 201 and the sub-client terminal when the client terminal 201 requests the content division download from the content service server.

The sub-client terminals 202, 203, and 204 transmit a content file piece, which is downloaded from the content service server 210 through the respective downlinks 216, 218, and 220 established by the request for downlink establishment by the client terminal 201, to the client terminal 201 through predetermined channels. At this time, the content file piece refers to a part of the content file, which the client terminal 201 requests from the content service server 210, and content file pieces divided by sequentially transmitting one content file for each of the established downlinks by the content service server 210.

The content file pieces divided for each downlink to be transmitted often comprises high-capacity multimedia files. Further, although the content file is a plurality of divided file pieces instead of one completed file, it is possible to identify content of the content file due to its nature.

The identification of the content file is possible through a process in which the content service server 210 divides the contents requested by the client terminal 201, assigns consecutive indexes to the divided contents, and sequentially transmits the divided contents 212 for each index to each of the downlinks 216, 218, and 220 through the downlinks 216, 218, and 220 established with the client terminal 201 and the identified sub-client terminals 202, 203, and 204.

The client terminal 201 successively completes the requested contents from the content service server 210 by using the indexes of the content file pieces transmitted from the sub-client terminals 202, 203, and 204, and decodes the contents by using the inherent information of the sub-client terminals 202, 203, and 204.

At this time, when the client terminal 201 forms consecutive contents with the content file pieces transmitted from the sub-client terminals 202, 203, and 204, the client terminal 201 can identify whether the content file pieces are omitted through a determination as to whether the indexes assigned to the content file pieces are sequential. When it is determined that the indexes are not sequential, that is, when there is an omitted content file piece, the client terminal 201 requests the download of the omitted content file piece from the content service server 210 again.

So far, the schematic construction of the system for providing the content download service according to an exemplary embodiment of the present invention has been described.

Hereinafter, a method of providing a content download service according to an exemplary embodiment of the present invention will be described in detail with reference to FIG. 3.

FIG. 3 is a flowchart illustrating a method of providing a content download service according to an exemplary embodiment of the present invention.

First, a client terminal 312 accesses a content service server 314 through a network in step 316, and performs an authentication in the content service server 314 by using information such as its own account ID and password in step 318.

Thereafter, in step 320 the client terminal 312 searches for an adjacent terminal capable of communicating within a predetermined area. Through step 320, the client terminal 312, which requests the communication from the adjacent terminal, broadcasts an inquiry message for the search of the adjacent terminal, and is connected with the searched adjacent terminal to perform the communication through a response message from the adjacent terminal received the inquiry message.

In step 322, the client terminal 312 makes a request for a downlink establishment to the content service server 314, which is currently accessing the searched adjacent terminal, that is, a sub-client terminal 310.

Through step 322, the client terminal 312 receives inherent information from the sub-client terminal 310, which permits the request for the downlink establishment of the client terminal 312. At this time, the inherent information contains, for example, a corresponding sub-client terminal's International Mobile Station Identity (IMSI) and International Mobile Equipment Identity (IMEI) required for the charge.

The client terminal 312 sets the corresponding sub-client terminal having transmitted the inherent information, that is, the sub-client having permitted the request for the downlink establishment with the content service server 314, as its sub-client terminal in step 326.

Further, in step 328, the client terminal 312 requests a content file download together with inherent information of one or more sub-client terminals, which are connected to the client terminal 312, from the content service server 314 through a search process for an adjacent terminal.

The content service server 314 identifies the client terminal 312 and one or more sub-client terminals 310 connected to the client terminal 312, and at step 330 establishes a downlink for routing the requested contents and a download control signal.

In step 332, the content service server 314 establishes a downlink for each of the client terminal 312 and the sub-client terminal 310 connected to the client terminal 312, divides the contents for each of the established downlink, and sequentially assigns consecutive indexes to divided content file pieces.

Thereafter, through step 334, the content service server 314 sequentially transmits each content file piece assigned the index, for each downlink established for each of the client terminal 312 and the sub-client terminal 310.

In step 336, the sub-client terminal 310 transmits the content file piece downloaded from the downlink established by the request for the downlink establishment of the client terminal 312 to the client terminal 312 through predetermined channels.

In step 338, the client terminal 312 successively integrates and completes the requested contents from the content service by using the index of the content file piece transmitted from the sub-client terminal 310.

In step 340, when the client terminal 312 forms consecutive contents with the content file piece transmitted from the sub-client terminal 310, the client terminal 312 identifies whether the content file piece is omitted through a determination as to whether the indexes assigned to the content file pieces are sequential. As a result of the identification, when the indexes are not sequential, that is, when there is an omitted content file piece, the client terminal 312 requests the download of the omitted content file piece from the content service server 314 again in step 342, and the content file piece corresponding to the index requested again is downloaded to the client terminal 312 in step 344.

With continued reference to FIG. 3, steps 340 and 342 enable only a required content file piece to be made a request for the download again through the identification of the omitted index when a certain client terminal or sub-client terminal generates an abnormal termination such as a power off while the content file is simultaneously downloaded for each downlink from the content service server 314. Further, steps 340 and 342 enable the client terminal 312 to finally integrate and complete the content file pieces transmitted for each downlink through the consecutive indexes. Otherwise if no index is omitted and the contents are integrated, the process ends as client terminal has received the request contents successfully.

It should be understood and appreciated by the artisan, that preferably, the method of FIG. 3 would be carried out with a number of sub-clients, such as shown in FIG. 2 so that the distributed processing includes a shorter time for downloading by distributing to a plurality of sub-clients.

Then, in step 346, the client terminal 312 decodes the integrated contents file by using the inherent information of the sub-client terminal having established the downlink in downloading the content file.

Accordingly, the presently claimed invention has an effect of reducing the time spent on the download by applying a distributed processing of the download of the requested contents to a plurality of sub-clients associated with a single client terminal, instead of the single client terminal, in a content download.

The present invention also has an effect of promptly receiving a service without a separate authentication procedure in using a download service required for the charge, by requesting a downlink establishment from a content service server by using inherent identification information of a sub-client by the client terminal having requested the contents, and decoding the downloaded contents.

A person of ordinary skill in the art should understand and appreciate that it is within the spirit of the invention and the scope of the appended claims that at least one of the client terminal and the adjacent terminal may comprise a mobile communication terminal.

In addition, it is also within the spirit of the invention and the scope of the appended claims that the content service server may comprise a mobile communication terminal communicatively coupled with a non-transitory storage medium containing content that is provided as content service.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. It should also be appreciated that proxy servers can be used in the network and the receipt of a request, transmission etc. by the content server should be construed as possibly involving or being made by a proxy server.

As described above, operations for the system and the method for providing the content download service according to the present invention may be implemented. While the present invention has been shown and described with reference to certain exemplary embodiments and drawings thereof, it will be understood by those skilled in the art that various changes in form and details may be made therein without departing from the spirit and scope of the invention as defined by the appended claims.

What is claimed is:

1. A system for providing a content download service, the system comprising:
a main client terminal configured to:
acquire identifying information from one or more client terminals;
set the one or more client terminals as one or more sub-client terminals; and
transmit a request for content to a content service server,
the content service server having a computer processor configured to:
receive the request for the content from the main client terminal accessed through a network;
identify the main client terminal and the one or more sub-client terminals communicatively coupled with the main client terminal based on the request;
establish connections to the identified main client terminal and the one or more sub-client terminals to transmit the requested content;
divide the requested content into a plurality of content file pieces corresponding to each of the main client terminal and the one or more sub-client terminals; and
transmit each of the plurality of content file pieces to the main client terminal and the one or more sub-client terminals, respectively,
wherein the main client terminal is further configured to:
receive the plurality of content file pieces of the requested content from the one or more sub-client terminals;
integrate the plurality of content file pieces into the requested content using index of the plurality of content file pieces; and
decode the integrated content by using the identifying information of the main client terminal or the one or more sub-client terminals.

2. The system as claimed in claim 1, wherein the main client terminal is configured to search for said one or more sub-client terminals with which the main client terminal can communicate, makes a request for a downlink establishment with a content service server currently accessing the searched for one or more sub-client terminals, and receives corresponding identifying information of the one or more sub-client terminals permitting the request for downlink establishment to set a particular terminal as the sub-client terminal.

3. The system as claimed in claim 2, wherein the corresponding identifying information is one of International Mobile Station Identity (IMSI), and International Mobile Equipment Identity (IMEI).

4. The system as claimed in claim 1, wherein the one or more sub-client terminals each transmit a content file piece to the main client terminal through predetermined channels, and which is downloaded from a downlink established by the request for the downlink establishment of the main client terminal, and
wherein the content file piece is received from the content service server.

5. The system as claimed in claim 4, wherein the main client terminal is configured to successively integrate the requested contents from the content service server by utilizing an index of the plurality of content file pieces transmitted from the one or more sub-client terminals, and decode the requested contents by using the identifying information of the sub-client terminal.

6. The system as claimed in claim 5, wherein the main client terminal is further configured to preregister terminal information of each sub-client terminal of the one or more sub-client terminals in a phone book and a sub-client list, and select a specific sub-client terminal of the one or more sub-client terminals to establish the connection between the content service server and the selected specific sub-client terminal without searching for a sub-client terminal, or requesting for permission to execute a content division download.

7. The system as claimed in claim 6, wherein a particular sub-client terminal of the one or more sub-client terminals is configured to approve a charge generated by establishing the connection between the content service server and the one or more sub-client terminals when the main client terminal transmits the request to the content service server.

8. The system as claimed in claim 7, wherein the content service server is configured to divide the requested content to assign consecutive indexes to the plurality of content file pieces, and sequentially transmit, for each index, the plurality of content file pieces to through each connection of the connections respectively established with the main client terminal and the one or more sub-client terminals.

9. The system as claimed in claim 8, wherein, when the main client terminal is configured to form consecutive content with the plurality of content file pieces transmitted from the one or more sub-client terminals, and identify an omitted file piece by utilizing the index, and reattempt download of the omitted file piece from the content service server.

10. A method of providing a content download service, the method comprising:
   receiving, by a content service server, a download request for a content service from a main client terminal accessed through a network;
   searching, by the main client terminal, for one or more adjacent terminals of the main client terminal, and making a request for a connection establishment from a content service server currently accessing the searched for adjacent terminal;
   receiving, by the main client terminal, identifying information from the one or more adjacent terminals permitting the request for connection establishment, and setting the one or more adjacent terminals as sub-client terminals of the main client terminal;
   identifying, by the content service server, the main client terminal and the one or more a sub-client terminals connected to the main client terminal based on the request, and establishing connections to the main client terminal and the one or more sub-client terminals to transmit the requested content;
   dividing, by a content service server, the requested content into a plurality of content file pieces corresponding to each of the main client terminal and the one or more sub-client terminals and transmitting each of the plurality of content file pieces to the main client terminal and the one or more sub-client terminals, respectively; and
   receiving, by the main client terminal, the plurality of content file pieces of the requested content from the one or more sub-client terminals, integrate the plurality of content file pieces into the requested content using index of the plurality of content file pieces, and decoding the integrated content by using the identifying information of the main client terminal or the one or more sub-client terminals.

11. The method as claimed in claim 10, wherein the content service server divides the requested content into the plurality of content file pieces and assigns an index to each of the plurality of content file pieces.

12. The method as claimed in claim 11, further comprising the main client terminal sequentially integrating the requested content by using an index of the plurality of content file pieces, and decoding the requested content by using the identifying information of the sub-client terminal.

13. The method as claimed in claim 10, wherein the main client terminal is configured to preregister information of the one or more sub-client terminals in a phone book and a sub-client list, and select a specific sub-client terminal of the one or more sub-client terminals, in order to establish a downlink between the content service server and the selected specific sub-client terminal without a search or a request for a permission in a content division download.

14. The method as claimed in claim 10, wherein the main client terminal broadcasts an inquiry message to search for the adjacent terminal that is adapted to perform Bluetooth communication in an inquiry process of searching for the adjacent terminal.

15. The method as claimed in claim 10, wherein at least one of the main client terminal and the sub-client terminals comprises a mobile communication terminal.

16. The method as claimed in claim 10, wherein the content service server comprises a mobile communication terminal communicatively coupled with a non-transitory storage medium containing the requested content.

17. An electronic device for providing a content download service comprising:
   a display;
   a communication module; and
   a processor configured to:
      search for one or more adjacent client terminals, via a communication module capable of communication with the electronic device and with a content service server;
      identify, via the communication module, the one or more adjacent client terminals as one or more sub-client terminals and receive identifying information from each of the one or more sub-client terminals;
      request, via the communication module, download of content from a content service server and transmit the identifying information to the content service server, wherein the content server, in response to the request, transmits a plurality of content file pieces of the requested content to the electronic device and the one or more sub-client terminals,
      receive, via the communication module, a portion of the plurality of content file pieces of the requested content from the content service server and the other portions of the plurality of content file pieces of the requested content from the one or more sub-client terminals;
      integrate the plurality of content file pieces into the requested content using index of the plurality of content file pieces;
      decode the integrated content by using the identifying information of the electronic device or the one or more sub-client terminals; and
      display the requested content on the display.

18. An electronic device for providing a content download service comprising:
   a memory storing a content;
   a communication module; and
   a processor configured to:
      receive, via the communication module, a request from a main client terminal to initiate download of the content and identifying information of the main client terminal and a plurality of sub-client terminals in communication with the main client terminal;

identify the main client terminal and the one or more sub-client terminals connected to the main client terminal based on the request;

establish connections to the identified main client terminal and the one or more sub-client terminals to transmit the requested content;

divide the requested content into a plurality of content file pieces corresponding to the main client terminal and the plurality of sub-client terminals; and transmit, via the communication module, each of the plurality of content file pieces to each of the main client terminal and the plurality of sub-client terminals, wherein the main client terminal receives the plurality of content file pieces from the plurality of sub-client terminals, integrate the plurality of content file pieces into the requested content using index of the plurality of content file pieces, and decodes the integrated content by using the identifying information of the main client terminal or the plurality of sub-client terminals.

* * * * *